US009241284B2

(12) United States Patent
Li et al.

(10) Patent No.: US 9,241,284 B2
(45) Date of Patent: Jan. 19, 2016

(54) MULTIMODE USER EQUIPMENT ACCESSING WIRELESS SENSOR NETWORK

(71) Applicant: Broadcom Corporation, Irvine, CA (US)

(72) Inventors: Zhenhong Li, Shanghai (CN); Haifeng Wang, Shanghai (CN); Jun Xia, Shanghai (CN); Yi Miao, Shanghai (CN)

(73) Assignee: BROADCOM CORPORATION, Irvine, CA (US)

( * ) Notice: Subject to any disclaimer, the term of this patent is extended or adjusted under 35 U.S.C. 154(b) by 184 days.

(21) Appl. No.: 13/975,559

(22) Filed: Aug. 26, 2013

(65) Prior Publication Data

US 2013/0343277 A1 Dec. 26, 2013

Related U.S. Application Data

(63) Continuation of application No. PCT/CN2011/071386, filed on Feb. 28, 2011.

(51) Int. Cl.
*H04W 28/04* (2009.01)
*H04W 48/10* (2009.01)
*H04W 48/14* (2009.01)
*H04W 48/18* (2009.01)
*H04W 84/18* (2009.01)

(52) U.S. Cl.
CPC .......... *H04W 28/044* (2013.01); *H04W 48/10* (2013.01); *H04W 48/18* (2013.01); *H04W 48/14* (2013.01); *H04W 84/18* (2013.01)

(58) Field of Classification Search
CPC ... H04W 48/10; H04W 48/14; H04W 48/044; H04W 48/18; H04W 28/044; H04W 84/18
See application file for complete search history.

(56) References Cited

U.S. PATENT DOCUMENTS

| 2007/0211675 | A1* | 9/2007 | Jain et al. ...................... 370/338 |
| 2010/0131644 | A1* | 5/2010 | Jeong et al. ...................... 709/224 |
| 2011/0130162 | A1* | 6/2011 | Park et al. ...................... 455/507 |
| 2011/0199934 | A1* | 8/2011 | Olofsson et al. .............. 370/252 |

FOREIGN PATENT DOCUMENTS

| CN | 101207900 A | 6/2008 |
| CN | 101578907 A | 11/2009 |
| CN | 101801055 A | 8/2010 |

OTHER PUBLICATIONS

PCT International Search Report and Written Opinion mailed Dec. 1, 2011, both of which were issued in a related PCT Application No. PCT/CN2011/071386 (9 pages).

* cited by examiner

*Primary Examiner* — Jianye Wu
(74) *Attorney, Agent, or Firm* — Foley & Lardner LLP; Christopher J. McKenna; Paul M. H. Pua

(57) ABSTRACT

A method, an apparatus and a computer-readable storage medium for accessing a wireless sensor network with a multimode user equipment. The method includes a user equipment receiving broadcasted wireless sensor network information; requesting access information for the wireless sensor network from a base station of a mobile data network; receiving the access information from the base station; and accessing the wireless sensor network using said access information.

20 Claims, 2 Drawing Sheets

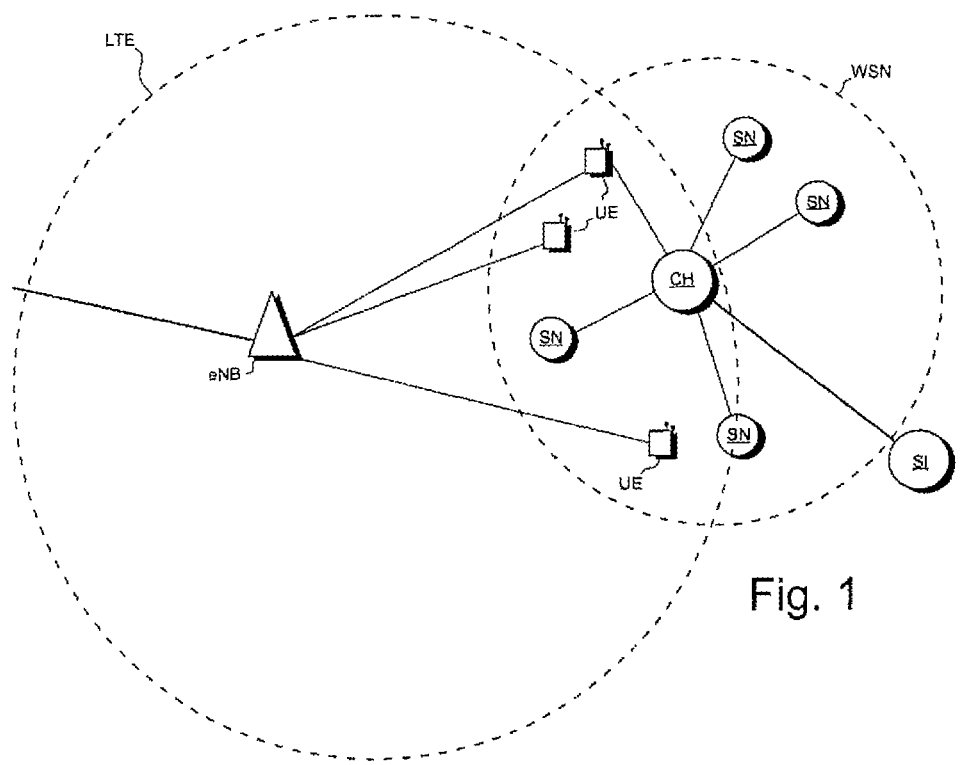
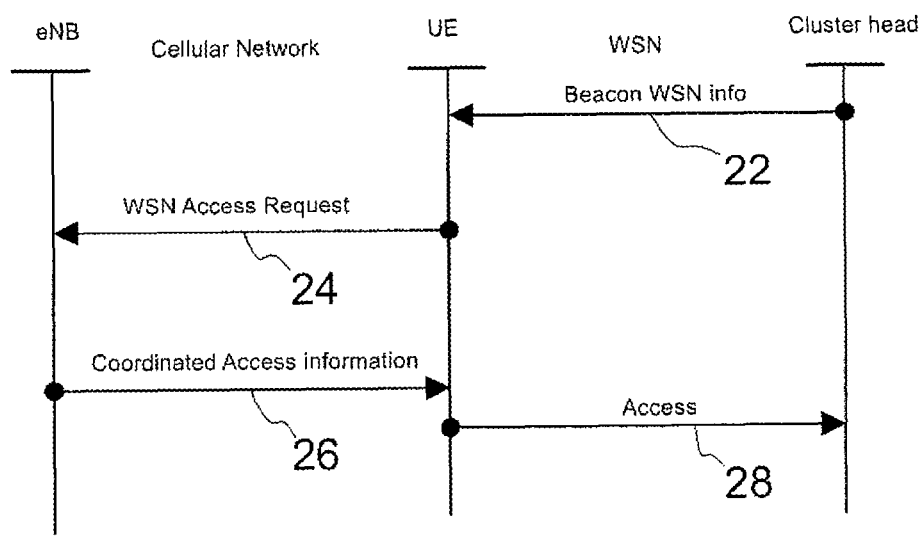
Fig. 2

MULTIMODE USER EQUIPMENT ACCESSING WIRELESS SENSOR NETWORK

CROSS REFERENCE TO RELATED APPLICATION

This application is a Continuation of PCT International Patent Application No PCT/CN2011/071386 filed on Feb. 28, 2011, the entire content of which is incorporated herein by reference.

FIELD OF TEE INVENTION

The invention relates to wireless communications. More specifically, the invention relates to multimode user equipments and wireless sensor networks.

BACKGROUND INFORMATION

A wireless sensor network, WSN, is a group of devices with wireless communication infrastructure and sensors to monitor and record conditions at diverse locations. Sensors are typically autonomous devices with limited power supply.

Different networks have specific characteristics that could be utilized for novel services by a user equipment such as mobile phone. One example of a multimode user equipment can access both a mobile data network and a wireless sensor network. The user equipment may also act as a gateway for the wireless sensor network, combining mobility and large data transmission capability to the measurement data from the sensor network.

As the energy consumption is critical for the wireless sensor network elements, an access method for the multimode user equipment becomes an important factor. One conventional WSN access method for wireless sensor network elements is a MAC protocol (MAC, Medium Access Control). Conventional access methods cause unnecessary collisions between the multimode user equipment and the wireless sensor network, thus reducing the spectral efficiency and sensor network density. Conventional access methods are suitable for wireless sensor networks including mainly WSN elements. The sensor elements are traditionally in a fairly static location in relation to the network. The multimode user equipment on the other hand is characteristically mobile, therefore creating a need for a more effective accessing method.

PURPOSE

The purpose of the invention is to present a new method, an apparatus and a computer program product that improves the efficiency of the wireless sensor networks when accessed by a multimode user equipment.

SUMMARY

The invention is related to a method including a user equipment receiving broadcasted wireless sensor network information; requesting access information for the wireless sensor network from a base station of a mobile data network; receiving the access information from the base station; and accessing the wireless sensor network using said access information. In one embodiment the user equipment is a multimode user equipment suitable for accessing the wireless sensor network and the mobile data network. In one embodiment the broadcasted wireless sensor network information includes cluster head identification and/or synchronization information. It may send also other necessary wireless sensor network cluster related information elements such as resource usage information within the cluster. The wireless sensor network broadcasts this information to enable new devices to access the sensor network.

In one embodiment requesting access information from the base station includes sending at least one wireless sensor network related information element to the base station. One example of such information element is the cluster head identification. The base station of the mobile data network can be aware of the network resource statue of the wireless sensor network, for example via a cellular link. In one embodiment the wireless sensor network cluster head or sink reports the wireless resource to the base station. The base station allocates an access slot for the user equipment. In another embodiment the access slot allocation is made in another network element of the mobile data network such as the Radio Network Controller, but the information is transmitted to the user equipment via the base station. In one embodiment the access information the user equipment receives from the base station includes an access arbitration table which includes the resource allocation information.

In one embodiment the base station is an evolved Node B, eNB. The evolved Node B is a base station according to 3GPP LTE. 3GPP, 3rd Generation Partnership Project, develops specifications for third generation mobile phone systems, and also from Release 8 (Rel-8) the next generation specifications often referred to as LTE, Long Term Evolution.

According to one aspect of the present invention, the invention presents an apparatus for wireless communication, including at least one processor and at least one memory including program code, wherein the at least one memory and the computer program code are configured to, with the at least one processor, cause the apparatus to receive broadcasted wireless sensor network information; request access information for the wireless sensor network from a base station of a mobile data network; receive the access information from the base station; and access the wireless sensor network using said access information. In one embodiment the processor is configured to send at least one wireless sensor network related information element, such as the cluster head identification to the base station when requesting access information from the base station. In one embodiment the processor is configured to communicate with the base station that is an evolved Node B.

According to one aspect of the present invention, the invention presents a computer program product including a computer-readable medium bearing computer program code embodied therein for use with a computer, the computer program code including receiving the broadcasted wireless sensor network information; requesting access information for the wireless sensor network from a base station of a mobile data network; receiving the access information from the base station; and accessing the wireless sensor network using said access information.

The benefits of the invention are improving wireless sensor network information collection or exchange capability as more user equipments are able to access the cluster head within a low inter-collision probability. Also the number of user equipments accessing the wireless sensor network increases, as the network traffic jam can be eliminated through the inherent jamming control mechanism in the coordination scheme.

BRIEF DESCRIPTION OF THE DRAWINGS

The accompanying drawings which are included to provide a further understanding of the invention and constitute a part of this specification, illustrate embodiments of the invention and together with the description help to explain the principles of the invention. In the drawings:

FIG. 1 is a block diagram of an example embodiment of the present invention illustrating network topology, FIG. 2 is a signaling diagram illustrating the messaging between the network elements.

DETAILED DESCRIPTION

Figure 3:
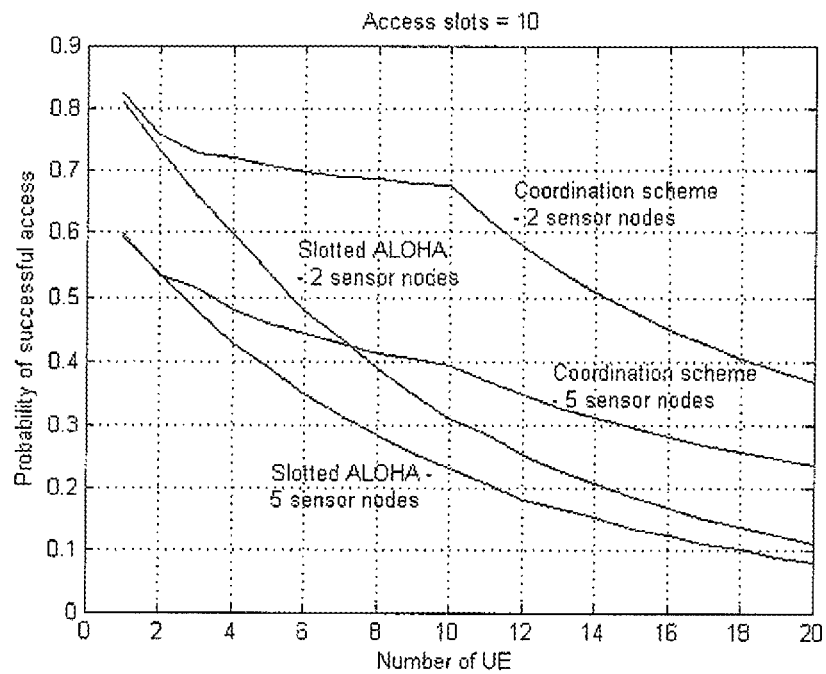
FIG. 3 is a simulated performance graph illustrating the successful access probability performance.

Reference will now be made in detail to embodiments of the present invention, examples of which are illustrated in the accompanying drawings.

FIG. 1 is a block diagram illustrating an example embodiment of the invention. The wireless sensor network WSN includes a cluster topology in which all sensor nodes SN communicate with the cluster head CH. The sensor nodes SN are typically equipped with a sensor element and a radio interface for the communication. The topology includes also a sink SI, which collects the measurement data from the sensor nodes SN. Examples of measurement data collected are temperature, humidity, pressure, wind direction and speed, voltage, human body functions, chemical concentrations, etc. The sink SI may also act as a gateway setting up and maintaining communications between the wireless sensor network WSN and other communications networks. The user equipment UE is a multimode terminal, it can communicate with the wireless sensor network WSN and a mobile network, such as 3G, 3G LTE, GSM or the like. In the embodiment according to the example the mobile data network is an LTE network.

The multimode user equipment UE is configured to access the wireless sensor network cluster head. Access protocols according to the prior art include a WSN MAC protocol. In one embodiment of the invention this protocol is extended to the multimode user equipment UE. The WSN MAC protocol is applied with an additional coordination for user equipments UE connected to the mobile data network.

In the conventional WSN MAC protocol, the sensor node's SN access to the wireless sensor network WSN is contention based. Many user equipments UE may attempt to access the network without pre-coordination. In one example of such contention based access the user equipment UE listens to available channels before sending an access request to the network. Wireless sensor networks operate usually at the unlicensed ISM band (ISM industrial, scientific and medical) that may lack free radio resources or at least are interfered by other devices operating at the same frequency. The overall performance of the network decreases as the probability for collisions increase. If a large number of user equipments UE attempts to access the wireless sensor network, this also causes collisions with sensor nodes SN. As a result, the sensor nodes SN may have to retransmit data and consume their internal energy storage. An efficient coordination scheme would mitigate the problem of unnecessary collisions within the group of multimode user equipments UE and the wireless sensor network.

In one exemplary usage scenario a single wireless sensor network WSN cell serves both user equipments UE and sensor nodes SN that function as a part of a highway traffic control system. An emergency situation could flood the network with attempts of attaching to the cluster head CH and causing a collision problem. Solving the problem of intra-collision in the user equipment group reduces also collisions between the user equipment group and the sensor node SN and thus improves wireless sensor network WSN efficiency.

An example of a random access technique suitable for wireless sensor network WSN environment is the ALOHA protocol. An improvement to the original ALOHA protocol is called a "Slotted ALOHA", introducing discrete timeslots and increasing the maximum throughput. A device can send only at the beginning of a timeslot, which reduces the number of collisions. For the present example transmission attempts are focused within a single LTE frame, since collisions can only occur during each timeslot. In the 3G LTE system frames include several individual slots and subframes.

Carrier Sense Multiple Access (CSMA) is a probabilistic Media Access Control (MAC) protocol in which a node verifies the absence of other traffic before transmitting on a shared transmission medium. An improvement over slotted ALOHA can be achieved by variations of CSMA, such as CSMA/CD, CSMA/CA and 1-persistent CSMA.

In the present invention the user equipment UE access coordination for the wireless sensor network WSN is controlled by the eNB. Referring to FIG. 2, an example signaling is disclosed between the cluster head CH and the multimode user terminal UE and between the multimode user equipment UE and eNB residing in the mobile data network LTE. The multimode user equipment NE is connected to the mobile data network LTE and the wireless sensor network WSN.

The cluster head CH broadcasts through the wireless sensor network WSN information containing an identification and synchronization signal to the wireless sensor network WSN. The user equipment UE receives the broadcasted information.

The user equipment UE sends to the wireless sensor network WSN an access request to eNB. Example transmission methods for the request are a Radio Resource Control message or physical uplink control channel. The request message may include at least one of the following information elements: an access indication, a cluster ID or other necessary WSN cluster related information elements such as resource usage information within the cluster.

The eNB receives the request from the user equipment UE accessing the cluster head CH and makes the decisions about the access options. There may be several access requests simultaneously; the eNB collects all user equipment UE requests, and allocates an access slot to a user equipment UE. The access slot length depends on the number of user equipments UE accessing the wireless sensor network WSN as well as the chosen allocation strategy.

After access request collection and analysis, the eNB broadcasts an access arbitration table to the user equipment UE via downlink cellular signaling. The eNB sends the access option attribution to the user equipment UE via a physical downlink control channel or Radio Resource Control message.

The user equipment UE begins the random access process to the cluster head CH using the timeslot that was assigned by the eNB. The wireless sensor network WSN cluster may report its residual wireless resource to eNB via a cellular link.

Figure 4:
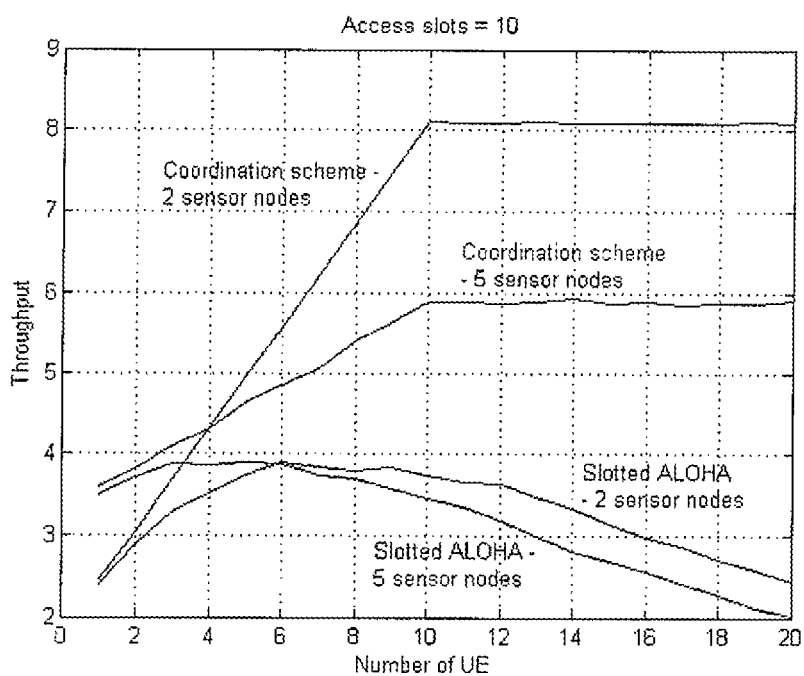
FIG. 4 is a simulated performance graph illustrating the throughput performance.

The effect of the present invention is illustrated by simulated performance graphs in FIGS. 3 and 4, where FIG. 3 illustrates the successful access probability performance and FIG. 4 the throughput performance. The primary simulation parameters are 1 cluster head;
10 access slots;
Number of sensor nodes 2 and 5;
Number of user equipments UE varies from 0 to 20

According to FIG. 2 the performance of the access probability mainly depends on the number of user equipments UE. When the number of user equipments UE accessing the wireless sensor network increases, a coordinated access scheme performs better than the traditional contention scheme. The access probability could be maintained on a relatively stable level in the environment of sufficient access slots. If the number of access slots is insufficient, thereby saturating the cluster, a new user equipment UE trying to access the cluster head CH will always fail, since eNB will prohibit the new user from accessing the cluster head. The probability of the success access rate is decreased, but still better than that of the traditional contention scheme.

As illustrated in FIG. 3, the performance of the throughput also depends on the number of user equipments UE. When the number of user equipments UE increases, a coordinated scheme performs better than the traditional contention scheme. The throughput of the coordination scheme increases linearly with the number of sufficient access slots. After the cluster has been saturated, the throughput could be maintained on a relatively stable level, since the eNB will prohibit new user equipments UE from accessing the cluster head.

The present invention decreases collision probability within user equipment UE access to the wireless sensor networks, enhances wireless sensor network WSN density and increases spectral efficiency. It improves the wireless sensor network WSN performance and cellular user experience.

Embodiments of the present invention may be implemented in software, hardware, application logic or a combination of software, hardware and application logic. In an example embodiment, the application logic, software or instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

If desired, the different functions discussed herein may be performed in a different order and/or concurrently with each other.

Furthermore, if desired, one or more of the above-described functions may be optional or may be combined. Although various aspects of the invention are set out in the independent claims, other aspects of the invention include other combinations of features from the described embodiments and/or the dependent claims with the features of the independent claims, and not solely the combinations explicitly set out in the claims.

It is obvious to a person skilled in the art that with the advancement of technology, the basic idea of the invention may be implemented in various ways. The invention and its embodiments are thus not limited to the examples described above; instead they may vary within the scope of the claims.

What is claimed is:

1. A method, comprising:
receiving, by a user equipment, information broadcasted by a wireless sensor network;
requesting access information for the wireless sensor network from a base station of a mobile data network;
receiving the access information from the base station, the access information comprising an access timeslot determined and allocated for the user equipment by the base station of the mobile data network; and
accessing the wireless sensor network using said access information.

2. The method according to claim 1, wherein a plurality of user equipment are attempting to access the wireless sensor network, and the access timeslot for the user equipment is determined and allocated by the base station of the mobile data network to coordinate access by the plurality of user equipment to the wireless sensor network.

3. The method according to claim 1, wherein the broadcasted wireless network information comprises at least one of synchronization information or cluster head identification.

4. The method according to claim 1, wherein requesting access information from the base station comprises sending at least one wireless sensor network related information element to the base station.

5. The method according to claim 1, wherein the access information that the user equipment receives from the base station comprises an access arbitration table.

6. The method according to claim 1, wherein the base station is an evolved Node B.

7. The method according to claim 1, comprising the wireless sensor network cluster head or sink reporting the wireless resource to the base station.

8. The method according to claim 2, wherein the access timeslot for the user equipment has an access slot length determined by the base station of the mobile data network according to the number of user equipment accessing the wireless sensor network.

9. An apparatus for wireless communication, comprising at least one processor and at least one memory storing computer program code which when executed by the at least one processor, causing the apparatus to:
receive information broadcasted by a wireless sensor network;

request access information for the wireless sensor network from a base station of a mobile data network;

receive the access information from the base station, the access information comprising an access timeslot determined and allocated for the apparatus by the base station of the mobile data network; and access the wireless sensor network using said access information.

10. The apparatus according to claim 9, wherein the broadcasted wireless sensor network information comprises cluster head identification and synchronization information.

11. The apparatus according to claim 9, wherein the processor is configured to cause the apparatus to send at least one wireless sensor network related information element to the base station when requesting access information from the base station.

12. The apparatus according to claim 9, wherein the access information received from the base station comprises an access arbitration table.

13. The apparatus according to claim 9, wherein the processor is configured to cause the apparatus to communicate with the base station that is an evolved Node B.

14. A non-transitory computer-readable storage medium comprising computer program code which when executed by a data processing system, causes the data processing system to:

receive information broadcasted by a wireless sensor network;

request access information for a wireless sensor network from a base station of a mobile data network;

receive the access information from the base station, the access information comprising an access timeslot determined and allocated for the data processing system by the base station of the mobile data network; and access the wireless sensor network using said access information.

15. The non-transitory computer-readable storage medium according to claim 14, wherein the broadcasted wireless sensor network information comprises cluster head identification.

16. The non-transitory computer-readable storage medium according to claim 14, wherein the broadcasted wireless network information comprises synchronization information.

17. The non-transitory computer-readable storage medium according to claim 14, wherein requesting access information from the base station comprises sending at least one wireless sensor network related information element to the base station.

18. The non-transitory computer-readable storage medium according to claim 14, wherein the access information received from the base station comprises an access arbitration table.

19. The non-transitory computer-readable storage medium according to claim 14, wherein the base station is an evolved Node B.

20. The non-transitory computer-readable storage medium according to claim 14, comprising the wireless sensor network cluster head or sink reporting the wireless resource to the base station.

* * * * *